A. P. OSBORN.
Lawn-Mowers.
No. 154,893. Patented Sept. 8, 1874.
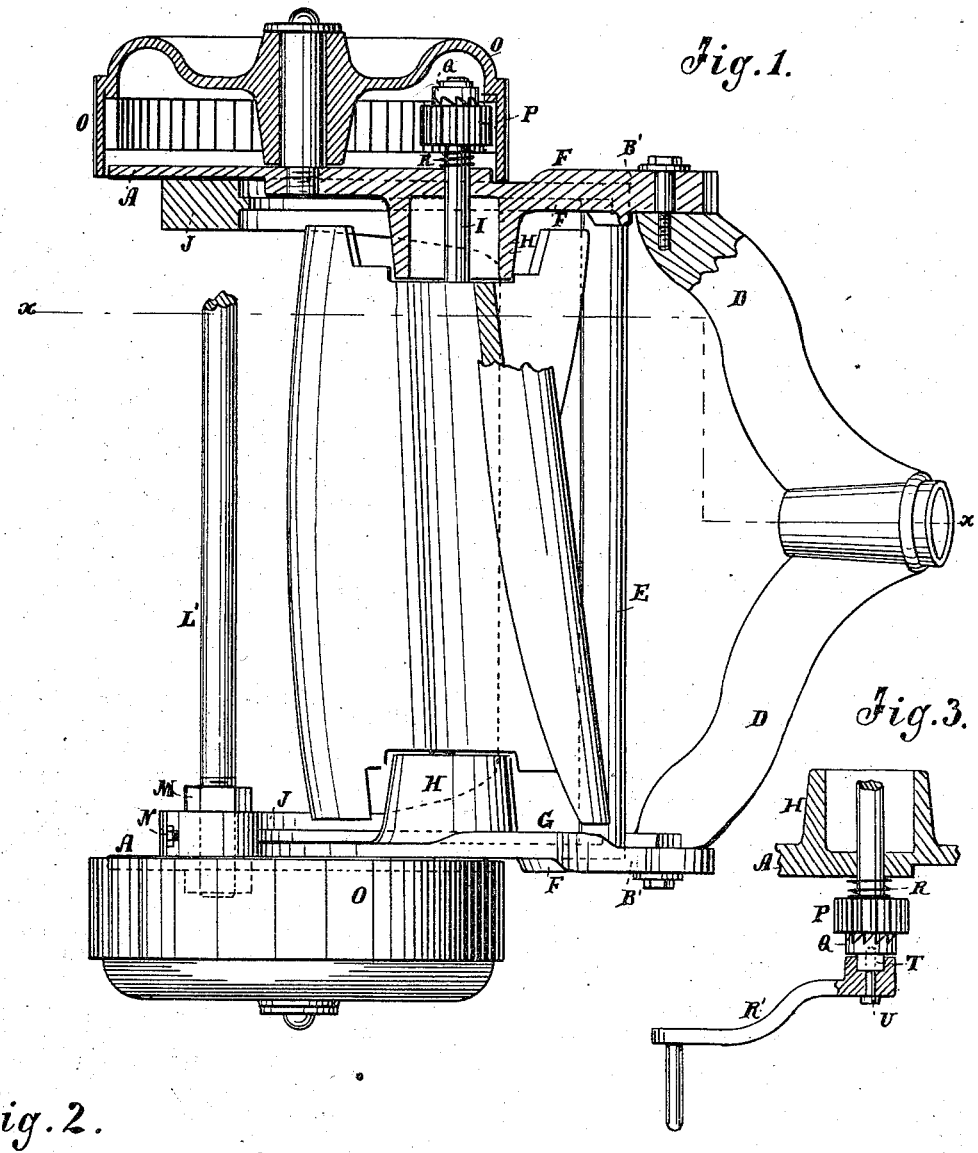
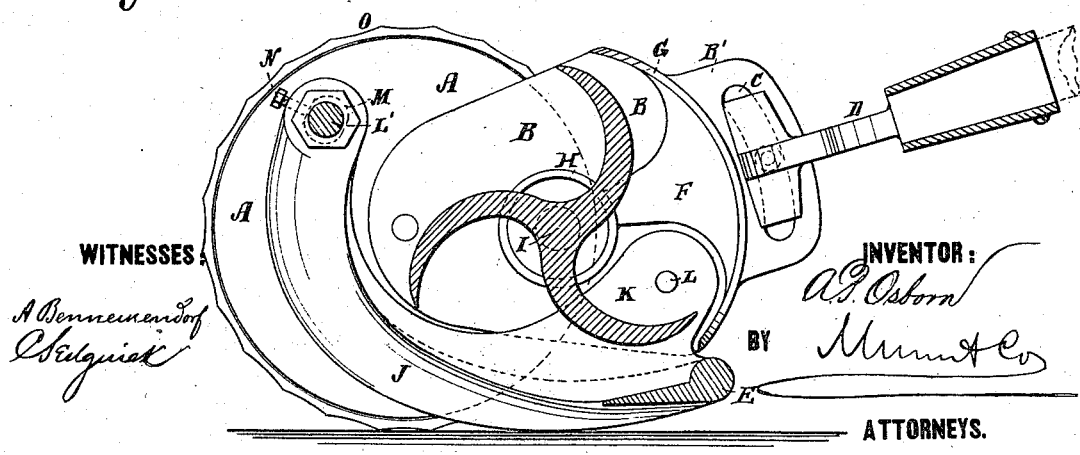

UNITED STATES PATENT OFFICE.

ALVAH P. OSBORN, OF SENECA FALLS, NEW YORK, ASSIGNOR TO EUGENE A. RUMSEY, OF SAME PLACE.

IMPROVEMENT IN LAWN-MOWERS.

Specification forming part of Letters Patent No. 154,893, dated September 8, 1874; application filed June 13, 1874.

*To all whom it may concern:*

Be it known that I, A. P. OSBORN, of Seneca Falls, New York, have invented a new and Improved Lawn-Mower; and I do hereby declare that the following is a full, clear, and exact description of the same, reference being had to the accompanying drawing, forming a part of this specification, in which—

Figure 1 is a plan view, partly in section. Fig. 2 is a longitudinal vertical section; and Fig. 3, a detailed view, partly in section.

The invention will first be fully described, and then pointed out in the claims.

A A represent heads, to which are journaled wheels O O, one of which is internally cogged to drive the pinion P on cutter-shaft I. These heads also have extensions B B with arc-slots C, through which the handle D is fastened by an adjustable screw, in order to adjust the position of knives with respect to the earth. E is the stationary cutter or cutter bar, which I provide with curved and projecting guards J that prevent the grass from getting beyond the ends of the knives before it is cut.

In order conveniently to adjust the stationary cutter-bar with respect to the rotary knives, I pivot the cutter-bar E to the head A at L, and fasten it at the upper end of projection J by screw-bolt L' and nut M. This may be done by an arc-slot, or in a series of holes in the heads A A, both being well-known means of fastening adjustable bars.

Having thus described my invention, what I claim is—

1. The curved projecting guards J J on the cutter-bar E, as and for the purpose described.

2. The combination, with heads A and pivoted cutter-bar E, of the guards J, screw-bolt L, and nut M, as and for the purpose specified.

A. P. OSBORN.

Witnesses:
T. B. MOSHER,
ALEX. F. ROBERTS.